United States Patent
Potter

[11] Patent Number: 5,527,177
[45] Date of Patent: Jun. 18, 1996

[54] TIP HEATER FOR A RUNNERLESS INJECTION MOLDING PROBE

[76] Inventor: Edward J. Potter, R.R. 1, Box 1506, Wilbur Rd., Hop Bottom, Pa. 18824

[21] Appl. No.: 255,327

[22] Filed: Jun. 7, 1994

[51] Int. Cl.⁶ .................................................. B29C 45/20
[52] U.S. Cl. ................ 425/190; 264/328.15; 425/192 R; 425/549
[58] Field of Search ...................... 425/549, 190, 425/192 R; 264/328.15

[56] References Cited

U.S. PATENT DOCUMENTS

| | | | |
|---|---|---|---|
| 3,800,027 | 3/1974 | Tsutsumi | 425/243 |
| 3,952,927 | 4/1976 | Schaumburg et al. | 222/510 |
| 4,238,671 | 12/1980 | Gellert | 219/421 |
| 4,279,588 | 7/1981 | Gellert | 425/568 |
| 4,309,163 | 1/1982 | Cottancin | 425/543 |
| 4,318,686 | 3/1982 | Morgan | 425/543 |
| 4,344,750 | 8/1982 | Gellert | 425/548 |
| 4,373,132 | 2/1983 | Vartanian | 219/421 |
| 4,376,244 | 3/1983 | Gellert | 219/523 |
| 4,438,064 | 3/1984 | Tsutsumi | 264/328.15 |
| 4,501,550 | 2/1985 | Nikkuni | 425/549 |
| 4,516,927 | 5/1985 | Yoshida | 425/549 |
| 4,517,453 | 5/1985 | Tsutsumi | 219/421 |
| 4,588,367 | 5/1986 | Schad | 425/549 |
| 4,643,664 | 2/1987 | Yoshida | 425/549 |
| 4,704,516 | 11/1987 | Tsutsumi | 219/421 |
| 4,711,625 | 12/1987 | Knauer et al. | 425/549 |
| 4,740,674 | 4/1988 | Tsutsumi | 219/523 |
| 4,771,534 | 9/1988 | Gellert et al. | 29/611 |
| 4,773,154 | 9/1988 | Gellert | 29/611 |
| 4,795,126 | 1/1989 | Crandell | 249/78 |
| 4,865,535 | 9/1989 | Gellert | 425/549 |
| 5,055,028 | 10/1991 | Trakas | 425/549 |
| 5,148,594 | 9/1992 | Gellert | 29/611 |
| 5,225,211 | 7/1993 | Imaida et al. | 425/190 |

*Primary Examiner*—Tim Heitbrink
*Attorney, Agent, or Firm*—Panitch Schwarze Jacobs & Nadel

[57] ABSTRACT

This invention relates to a tip heater for a runner-less injection molding heating probe and to methods for constructing and repairing the same. The tip heater comprises a generally conical shaped tip, a heating wire, insulating material, and a cap. The tip heater is attached to a heating probe positioned within resin channels communicated to mold cavities. The tip heater is characterized by removable and replaceable tips and/or caps which allow the tip heater to be repaired.

19 Claims, 4 Drawing Sheets

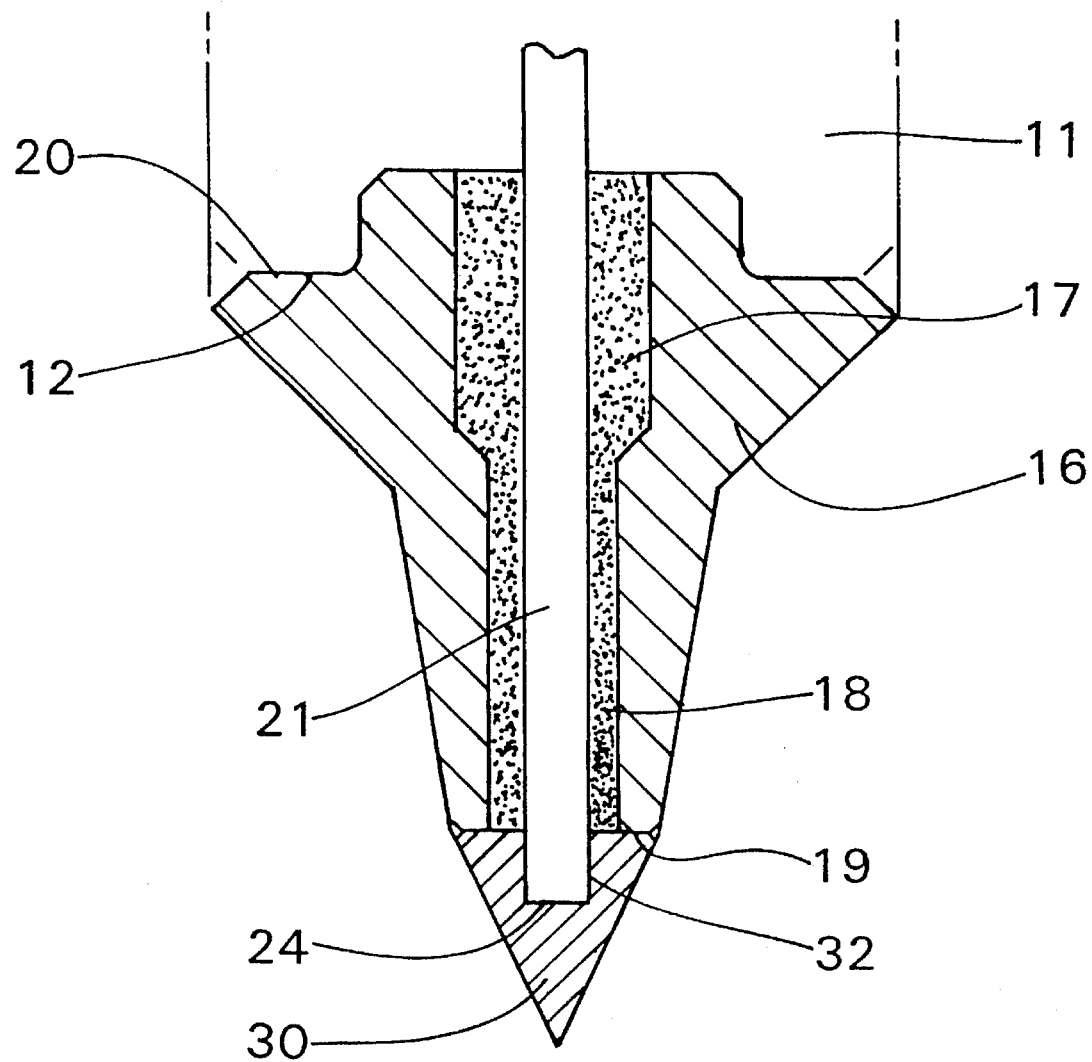

5,527,177

TIP HEATER FOR A RUNNERLESS INJECTION MOLDING PROBE

BACKGROUND OF THE INVENTION

This invention relates to a heat-generating device for molds of injection molding machines and, more specifically, to a tip heater for use on a runnerless injection molding heating probe.

Conventional heat-generating devices commonly called torpedoes or probes for runnerless injection molding are disclosed in U.S. Pat. Nos. 4,516,927 and 4,643,664 to Yoshida. These patents disclose pointed heat-generating devices in which a heat-generating wire disposed within a bore in a non-processed cylindrical material is joined to the non-processed cylindrical material by fusion to form an alloy. The alloy portion is then machined to form a point. The alloy point is commonly called a "tip heater". Tip heaters of the type disclosed by Yoshida are relatively easy to construct; however, tip heaters constructed by fusing the heating wire to a non-processed cylindrical material and then machining the alloy to a point have several disadvantages. Alloy materials which form the tip of conventional tip heaters have unpredictable hardness due to the fusion process by which the alloy is formed. When molding abrasive resins, it is common for alloy point tip heaters to fail due to wear at the alloy point. A need therefore exists for a heat generating device which has a tip heater having a known hardness to match the abrasive environment in which the device is to be used.

Another disadvantage of alloy pointed tip heaters is the tendency for the alloy material to exhibit microscopic porosity to molten polymer resins. Alloy points often have microscopic pores through which molten resin can enter into the body of the heating probe resulting in fouling of the probe and associated equipment over time. A need therefore exists for a probe having a tip heater which is not susceptible to resin porosity.

Another disadvantage of alloy pointed tip heaters is that alloy pointed tip heaters are difficult to repair once the alloy portion becomes damaged due to wear from molding abrasive resins, accidents, or abuse of the molding equipment. The repair difficulty is due to the uncertainty of determining exactly where the wire is fused to the unprocessed material. Since the exact location of the alloy-to-wire junction is unknown, it is difficult to know how much of the tip must be removed in order to effect repairs. A need, therefore, exists for a tip heater for use during runnerless injection molding which provides a pointed portion in which the wire to point junction is known thereby allowing for easy tip heater repair.

Accurate placement of wire to point junction also greatly improves consistency of thermal performance guaranteeing identical behavior between multiple probes in a mold.

SUMMARY OF THE INVENTION

It is an object of this invention to provide a tip heater for attachment to a heating probe used for runnerless injection molding in which the tip heater point has a known hardness. It is also an object of this invention to provide a tip heater which is not subject to resin porosity.

It is also an object of this invention to provide a tip heater having a known heating wire and point juncture which facilitates tip heater repair.

To achieve the foregoing and in accordance with the purposes of the present invention as embodied and broadly described herein, the present invention provides a tip heater attached to a heating probe having a metal body having a front end, a back end, and a longitudinal bore, the probe utilized in runnerless injection molding machines for opening and closing mold gates by ON-OFF switching of the tip heater.

The tip heater comprises a generally conically shaped tip, a cap, a heating wire, and an insulating material. The generally conically shaped tip is attached to the front end of the metal body. The tip has a front and a back end, and a first and a second longitudinal bore. The first longitudinal bore of the tip is aligned with the longitudinal bore of the metal body. The cap has a socket and is attached to the front end of the tip. The socket is aligned with the second longitudinal bore of the tip. The heating wire has a first end and a second end and is disposed in the bore of the metal body and in the first and second longitudinal bores of the tip. The first end of the heating wire is attached to the cap at the socket and the second end of the heating wire is electrically connectable to an ON-OFF switch such that the heating wire heats the cap when the switch is ON and the heating wire does not heat the cap when the switch is OFF. The insulating material is disposed between the bore of the metal body and the heating wire and between the bores of the tip and the heating wire.

In yet another embodiment of this invention, the tip heater is attached to a heating probe having a metal body having a front end, a back end and a longitudinal bore, the probe utilized in runnerless injection molding machines for opening and closing mold gates by ON-OFF switching of the tip heater. The tip heater comprises a generally conically shaped tip, a heating wire, and an insulating material. The generally conically shaped tip is attached to the front end of the metal body. The tip has a pointed front end, a back end, a recess and a socket. The socket is aligned with the recess, and the recess is aligned with the longitudinal bore of the metal body. The heating wire is disposed in the bore of the metal body and disposed in the recess of the tip. The heating wire has a first end and a second end. The first end of the heating wire is attached to the tip at the socket. The second end of the heating wire is electrically connectable to an ON-OFF switch such that the heating wire heats the tip when the switch is ON and the heating wire does not heat the tip when the switch is OFF. The insulating material is disposed between the bore of the metal body and the heating wire, and between the recess of the tip and the heating wire.

Another aspect of this invention provides a method for constructing a tip heater attached to a heating probe.

Yet other aspects of this invention provide methods for repairing tip heaters attached to heating probes.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 1A is an enlarged, partially, cut-away sectional view of the tip and cap of the tip heater illustrated in FIG. 1.

DESCRIPTION OF THE PREFERRED EMBODIMENTS

Figure 1:
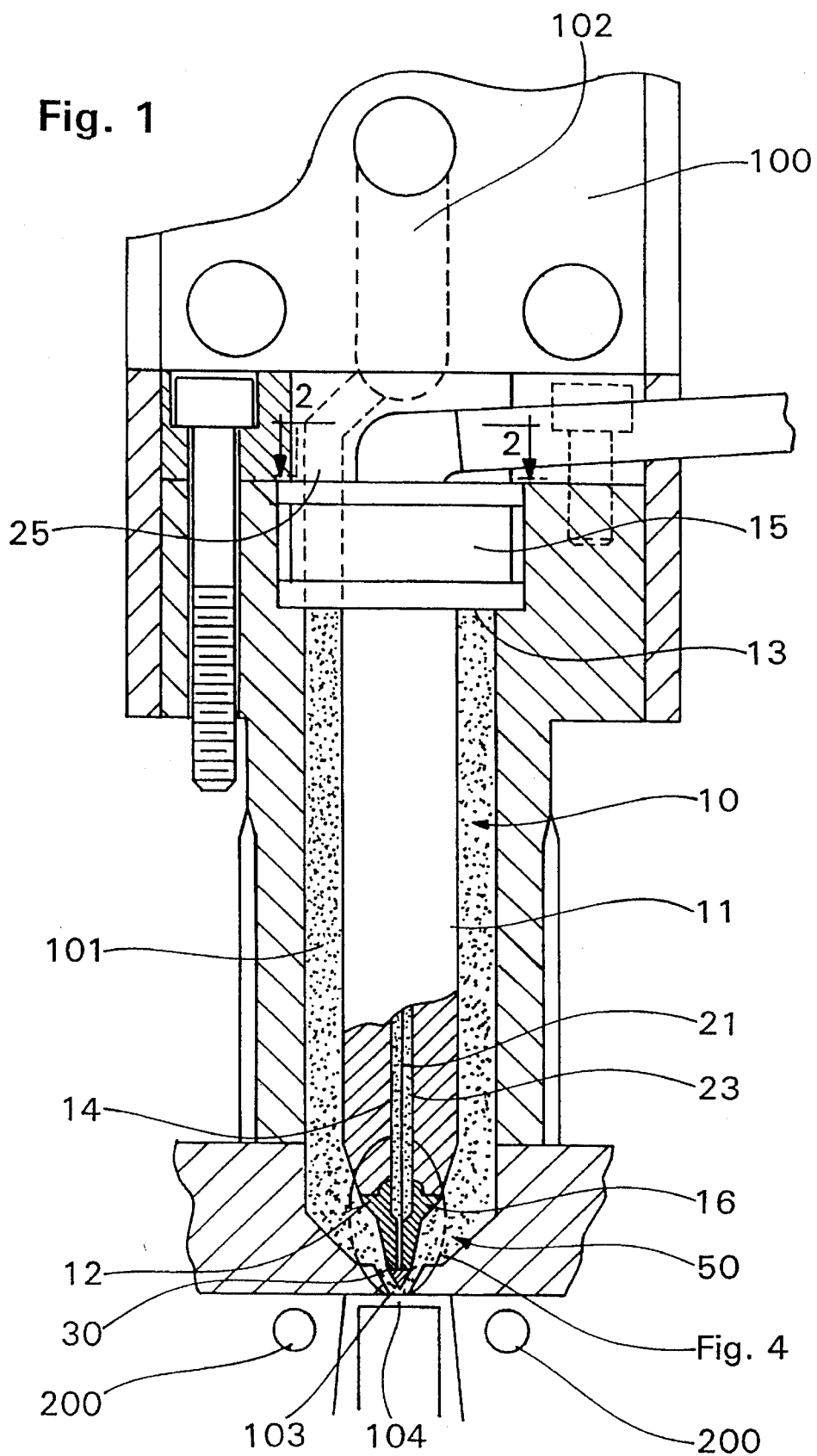
FIG. 1 is a partially cut-away sectional view of a heating probe with an attached tip heater.

A tip heater 50 of the present invention is shown generally in the circled area in FIG. 1 attached to a probe 10 also shown generally in FIG. 1. Tip heater 50 is comprised of a generally conically shaped tip 16, a heating wire 21, insulating material 23, and a cap 30. Probe 10 has generally a cylindrical metal body 11 and a head 15.

Figure 2:
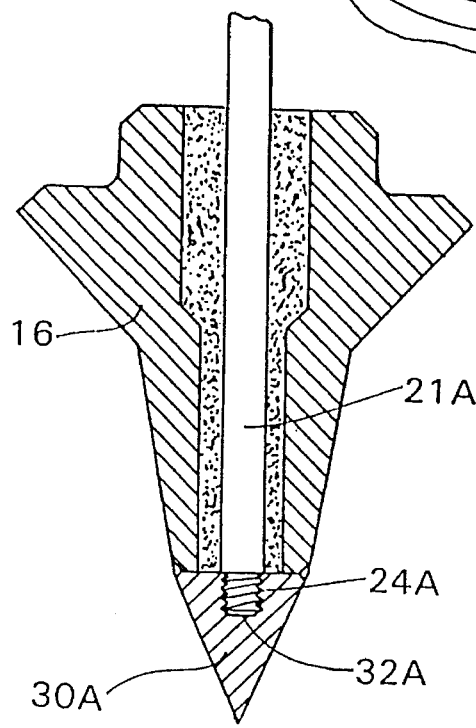
FIG. 2 is a sectional view of the probe illustrated in FIG. 1 taken along line 2—2.

Metal body 11 has a front end 12, a back end 13, and a longitudinal bore 14. The back end 13 of body 11 is attached to head 15. Head 15 is positioned such that metal body 11 is disposed within mold resin channel 101 as shown in FIGS. 1. Head 15 is shown in FIG. 1 having resin channels 25 shown in FIG. 2 which are positioned in fluid communication with resin channels 102 of a manifold 100. The front end 12 of body 11 is attached to tip heater 50. Tip heater 50 includes a generally conical tip 16 having a first longitudinal bore 17, a second longitudinal bore 18, a front end 19, and a back end 20 as shown in detail in FIG. 1A. Back end 20 is attached to front end 12 of body 11. Front end 19 is attached to cap 30. Cap 30 has a generally conical shape and a socket 32. Heating wire 21 is disposed within bores 14, 17, and 18 and has a front end 24. Front end 24 of wire 21 is attached to cap 30 at socket 32. The back end of wire 24 is electronically connectable to an ON-OFF switch (not shown). Insulating material 23 such as but not limited to magnesium oxide or a ceramic sleeve is disposed within bores 14, 17, and 18 to separate and thermally insulate heating wire 21 from metal body 11 and from tip 16. Electrical current flowing through heating wire 21 heats cap 30. An electrical return can be attached to the mold or to the probe to provide electrical continuity. The flow of electricity through heating wire 21 is controlled by an ON-OFF switch such that when the ON-OFF switch is ON, the electricity flow through wire 21 heats cap 30 and when the ON-OFF switch is OFF, electricity does not flow through wire 21 and cap 30 is not heated. Cylindrical metal body 11 can also have one or more body heaters (not shown in the drawings) as are well known in the art to maintain the molten state of resin within channel 101 and within head channels 25 during each injection molding cycle.

Probe 10 is positioned within resin channel 101 such that molten resin from an injection molding machine can flow through manifold channel 102, through head channel 25, into channel 101, through gate 103, and into a cavity 104 in the mold.

Tip heater 50 is utilized by an ON-OFF switch electrically connected to wire 21 being switched ON resulting in heating wire 21 becoming hot. As a result, cap 30 becomes hot, melting solidified resin in gate 103. Molten resin under pressure then flows through channels 102, 25, 101, gate 103, and into the mold 104. Anytime after flow through the gates is established, the ON-OFF switch attached to wire 21 is switched OFF causing wire 21 to cease heating. Cooling lines 200 in the mold solidify resin in the areas adjacent tip 16 and cap 30 thereby closing gate 103 yet allowing resin in channels 101, 25, and 102 to remain molten. Closing gate 103 allows the mold to be opened and the molded part to be removed without molten resin flowing through gate 103, and without excess resin waste attaching to the molded part from gate 103, thus, permitting runnerless molding to occur.

Over time, the flow of molten resin through passages 101 and gate 103 can cause tip 16 and cap 30 to abrade and eventually improperly open and close gate 103. Probe tip heaters can also become damaged through accident or abuse often resulting in deformation of the tip heater point or separation of the heating wire from the heater point resulting in improper gate closure. Alloy pointed tip heaters are not easily repaired and often necessitate replacement of the entire heating probe when the alloy point is damaged. In addition, if between molding operations, probe users notice that a point on a particular alloy pointed tip heater is not withstanding the wear due to abrasive resin environments, an entire new heating probe must be purchased without any assurance that the alloy point on the new probe tip heater will withstand the abrasiveness of the resin environment that the new probe is to be used in. The instant invention solves this problem by providing a tip heater with a pointed cap which is constructed to be repaired and which has a point with a known hardness to match the resin that the tip heater is to be used in.

Figure 3:
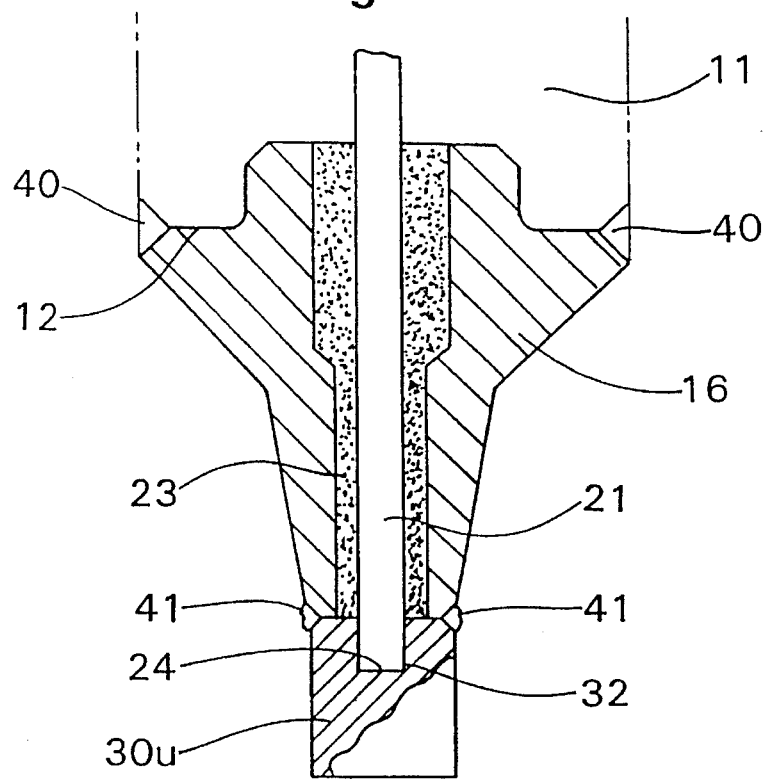
FIG. 3 is a partially cut-away enlarged sectional view of the tip heater showing a device under construction.
Figure 4:
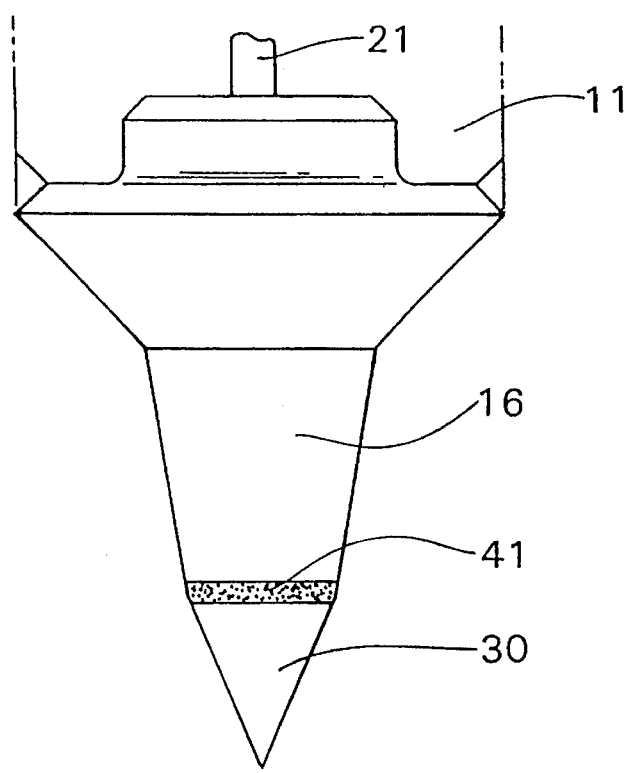
FIG. 4 is a partially cut-away enlarged sectional view of the completed tip heater.

The method for constructing a tip heater of this invention is herein described with reference to FIG. 3. Front end 12 of metal body 11 is joined to tip 16 by welding or brazing at the adjacent peripheries 40. Wire 21 is then disposed within bores 14, 17, 18. An unprocessed cap 30U of a material having a known hardness and having a socket 32 is then placed adjacent tip 16 such that front end 24 of wire 21 is disposed in socket 32. Unprocessed cap 30U is then joined to tip 16 by welding or brazing at adjacent peripheries 41 and then insulating material 23 is packed between bores 14, 17, 18, and wire 21. The unprocessed cap is then swaged to secure the front end 24 of wire 21 within socket 32 and is then machined to a point to form cap 30 as shown in FIGS. 1, 1A, and 4. The invention thus provides a repairable tip heater which overcomes the problem of unknown point hardness associated with alloy pointed tip heaters by providing a pointed cap having known hardness. Additionally, since the point is not constructed by fusion to form an alloy, the tip heater does not suffer from resin microporosity problems.

The cap, as shown in FIG. 4, can be easily repaired by the method of cutting through fused circumference 41 or grinding cap 30 off to the known cap-wire juncture at circumference 41. A repair cap is then attached to wire 21, joined to tip 16, and ground to a point, thus, eliminating the need to replace the entire device 10 every time cap 30 is damaged. Repair is made easy by this invention since the problem of unknown wire-alloy juncture, which is associated with alloy pointed tip heaters, is eliminated.

If the tip 16 is damaged, the tip 16 can be repaired by cutting through area 40 and removing tip 16, wire 21, and insulating material 23 from body 11. A repair wire which is either a new wire 21 or the old wire 21 is then inserted into body 11, a new repair tip 16 is joined to body 11 at adjacent peripheries 40, a new, unprocessed cap of a material having a known hardness is attached to the repair wire and is joined to the repair tip. Insulating material is then packed between the repair heating wire and the metal body and between the heating wire and the repair tip. The unprocessed cap is then machined to a point.

Figure 5:
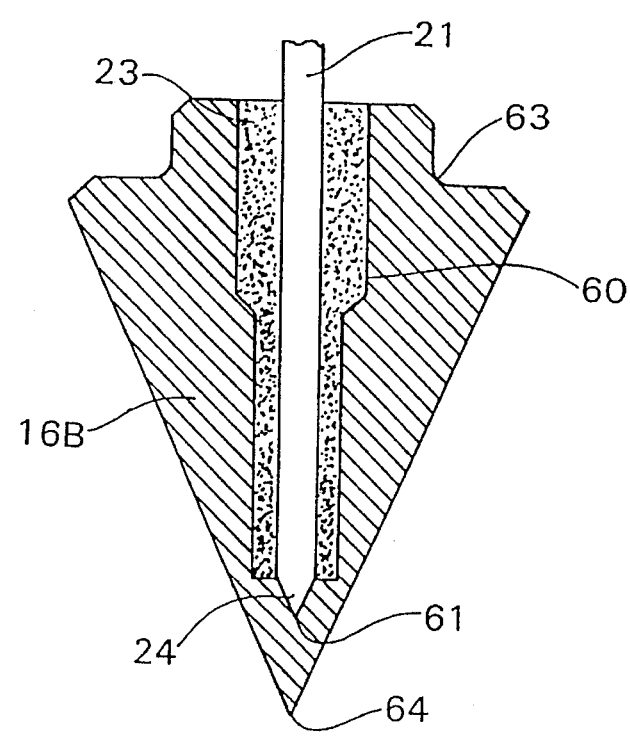
FIG. 5 is a cut-away enlarged sectional view of one embodiment of the tip heater cap and tip.

Another embodiment of the invention is shown in FIG. 5 where, in lieu of swaging the heating wire to the caps, the heating wire 21A has a threaded first end 24A attached to a threaded socket 32A in cap 30A. Cap 30A shown in FIG. 5 can be repaired by cutting through joined circumference 41, unscrewing cap 30A from wire 21A, re-attaching a new repair threaded cap to wire 21A and joining the repair cap to tip 16.

Figure 6:
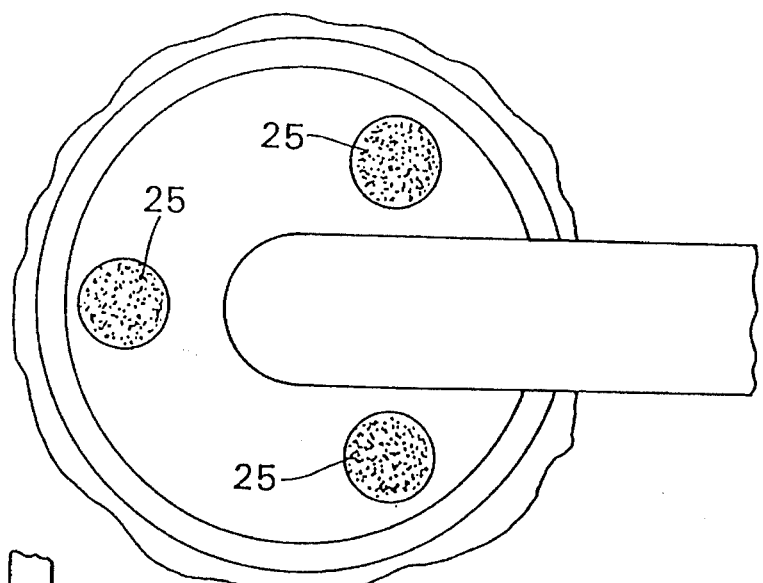
FIG. 6 is a cut-away enlarged sectional view of another embodiment of the tip heater tip.

Another embodiment of the invention is shown in FIG. 6. The tip heater shown in FIG. 6 is comprised of a generally conical shaped tip 16B, a heating wire 21, and insulating material 23. Tip 16B has a point 64, a back end 63, a recess 60, and a socket 61. Back end 13 is joined to the metal body of a probe having a longitudinal bore (not shown). Heating wire 21 has a first end 24 attached to tip 16B at socket 61 and a second end electrically connectable to an ON-OFF switch (not shown). Insulating material 23 is disposed between the bore of the probe metal body and heating wire 21 and between recess 60 of tip 16B and heating wire 21. Point 64 is heated when the ON-OFF switch is ON and is not heated when the ON-OFF switch is OFF. To repair this embodiment of the tip heater, the entire tip can be removed by cutting through the area attaching tip 16B to a metal body (not shown in FIG. 6) and removing wire 21 and insulating material 23 from device 10. A repair wire is then inserted into the probe metal body and into the recess and socket of a repair tip. The repair tip is then joined to the metal body, insulating material is packed between the repair wire and the metal body and between repair wire and the repair tip, and the tip is swaged to compress the insulating material and to secure the repair wire within the socket of the repair tip.

The joining of cylindrical metal bodies to tips and tips to caps can be accomplished by conventional welding, fusion welding, laser welding, by brazing, by an electron beam, or by any other means well known in the art so long as the joining of cylindrical bodies to tips and tips to caps, allows tips and/or caps to be removed and replaced by new repair tips and/or caps as needed. The attachment of heating wires to tips or wires to caps can be accomplished as described herein by swaging or by threading as well as by cryogenic shrink fitting. Additionally, the heat-generating device described herein has been described as having a head portion located below the manifold. However, it is within the scope of this invention that the tip heater can be utilized with other probe types such as but not limited to probes having heads positioned within manifolds or probes having heads positioned on opposite sides of manifolds from the tip heaters.

Thus, the invention provides a tip heater for use on a heating probe used for runnerless injection molding which has a point of known hardness which is not subject to resin porosity and which is easily repaired.

While the preferred embodiments have been fully described and depicted for the purposes of explaining the principles of the present invention, it will be appreciated by those skilled in the art that modification and changes may be made thereto without departing from the scope of the invention set forth in the appended claims.

I claim:

1. A heat-generating device in the form of a tip heater attached to a heating probe utilized in runnerless injection molding machines for opening and closing mold gates by ON-OFF switching of the tip heater, said probe having a metal body having a front end, a back end, and a longitudinal bore, said tip heater comprising:

a generally conical shaped tip attached to said front end of said metal body, said tip having a front and a back end, and said tip having a first and a second longitudinal bore, said first longitudinal bore of said tip aligned with said longitudinal bore of said metal body;

a cap having a socket, said cap attached to said front end of said tip, said socket aligned with said second longitudinal bore of said tip;

a heating wire having a first end and a second end, said heating wire disposed in said bore of said metal body and disposed in said first and second longitudinal bores of said tip, said first end of said heating wire attached to said cap at said socket; said second end of said heating wire electrically connectable to an ON-OFF switch such that said heating wire heats said cap when said switch is ON and said heating wire does not heat said cap when said switch is OFF; and an insulating material disposed between said bore of said metal body and said heating wire and between said bores of said tip and said heating wire.

2. The heat-generating device of claim 1 wherein said tip is removably attached to said metal body.

3. The heat-generating device of claim 2 wherein said cap is removably attached to said tip.

4. The heat-generating device of claim 2 wherein said tip is welded to said metal body along adjacent peripheries of said back end of said tip and said front end of said metal body.

5. The heat-generating device of claim 2 wherein said tip is brazed to said metal body along adjacent peripheries of said back end of said tip and said front end of said metal body.

6. The heat-generating device of claim 3 wherein said heating wire is attached within said socket of said cap by swaging of said cap to said wire.

7. The heat-generating device of claim 3 wherein said first end of said heating wire is threaded, wherein said socket of said cap is threaded and wherein said first end of said heating wire is threadably attached to said socket of said cap.

8. The heat-generating device of claim 3 wherein said heating wire is fixed within said socket of said cap by cryogenic shrink fitting.

9. The heat-generating device of claim 3 wherein said cap is welded to said tip along adjacent peripheries of said cap and said front end of said tip.

10. The heat-generating device of claim 3 wherein said cap is brazed to said front end of said tip.

11. A heat-generating device in the form of a tip heater attached to a heating probe utilized in runnerless injection molding machines for opening and closing mold gates by ON-OFF switching of the tip heater, said probe having a metal body having a front end, a back end, and a longitudinal bore, said tip heater comprising;

a generally conical shaped tip attached to said front end of said metal body, said tip having a back end and a pointed front end, said tip having a recess and a socket, said socket aligned with said recess, said recess aligned with said longitudinal bore of said body, a heating wire disposed in said bore of said metal body and disposed in said recess of said tip, said heating wire having a first end and a second end, said first end of said heating wire attached to said tip at said socket, said second end of said heating wire electrically connectable to an ON-OFF switch such that said heating wire heats said tip when said switch is ON and said heating wire does not heat said tip when said switch is OFF; and an insulating material disposed between said bore of said metal body and said heating wire, and between said recess of said tip and said heating wire.

12. The heat-generating device of claim 11 wherein said tip is removably attached to said metal body.

13. The heat-generating device of claim 11 wherein said wire is fixed within said tip socket by swaging.

14. The heat-generating device of claim 11 wherein said wire is fixed within said tip socket by cryogenic shrink fitting.

15. The heat-generating device of claim 11 wherein said tip is welded to said metal body along adjacent peripheries of said back end of said tip and said front end of said metal body.

16. The heat-generating device of claim 11 wherein said tip is brazed to said body along adjacent peripheries of said back end of said tip and said front end of said body.

17. A tip heater for use on a heating probe utilized in runnerless injection molding machines for opening and closing mold gates by ON-OFF switching of the tip heater, said probe having a metal body having a front end, a back end, and a longitudinal bore wherein the improvement comprises:

a generally conically shaped tip removably attached to said front end of said metal body, said tip having a front and a back end, and said tip having a first and a second longitudinal bore, said first longitudinal bore of said tip aligned with said longitudinal bore of said body;

a cap having a socket, said cap removably attached to said front end of said tip, said socket aligned with said second longitudinal bore of said tip;

a heating wire disposed in said bore of said metal body and disposed in said first and second longitudinal bores of said tip, said first end of said heating wire attached to said cap at said socket; said second end of said heating wire electrically connectable to an ON-OFF switch such that said heating wire heats said cap when said switch is ON and said heating wire does not heat said cap when said switch is OFF; and an insulating material disposed between said bore of said metal body and said heating wire and between said bores of said tip and said heating wire.

18. A tip heater for use on a heating probe utilized in runnerless injection molding machines for opening and closing mold gates by ON-OFF switching of the tip heater, said probe having a metal body having a front end, a back end, and a longitudinal bore wherein the improvement comprises:

a generally conically shaped tip removably attached to said front end of said cylindrical metal body, said tip having a pointed front and a back end, said tip having a recess and a socket, said socket aligned with said recess said recess aligned with said longitudinal bore of said cylindrical body;

a heating wire disposed in said bore of said metal body and disposed in said recess of said tip, said heating wire having a first end and a second end, said first end of said heating wire attached to said tip at said socket; said second end of said heating wire electrically connectable to an ON-OFF switch such that said heating wire heats said tip when said switch is ON and said heating wire does not heat said tip when said switch is OFF; and an insulating material disposed between said bore of said metal body and said heating wire and between said recess of said tip and said heating wire.

19. A tip heater attached to a heating probe utilized in runnerless injection molding machines for opening and closing mold gates by ON-OFF switching of the tip heater, said probe having a metal body, said tip heater comprising:

a tip having a bore, said tip removably attached to said metal body of said probe;

a pointed cap having a socket, said cap removably attached to said tip;

a heating wire disposed in said tip bore and attached to said cap at said socket; and insulating material disposed between said tip bore and said heating wire;

wherein said cap has a known hardness, said cap and said tip are impermeable to polymer resin, wherein said tip is removably attached to said metal body and wherein said cap is removably attached to said tip to facilitate tip heater repair.

* * * * *